(12) United States Patent
Wei et al.

(10) Patent No.: US 6,787,728 B2
(45) Date of Patent: Sep. 7, 2004

(54) METHOD AND APPARATUS FOR NEAR NET SHAPE RAPID ROUGH ELECTROMACHINING FOR BLISKS

(75) Inventors: Bin Wei, Mechanicville, NY (US); Martin Lee, Niskayuna, NY (US); Roger Etherington, Boxford, MA (US); Michael Lamphere, Hooksett, NH (US)

(73) Assignee: General Electric Company, Niskayuma, NY (US)

( * ) Notice: Subject to any disclaimer, the term of this patent is extended or adjusted under 35 U.S.C. 154(b) by 10 days.

(21) Appl. No.: 10/248,215

(22) Filed: Dec. 27, 2002

(65) Prior Publication Data

US 2004/0124181 A1 Jul. 1, 2004

(51) Int. Cl.⁷ .............................. B23H 7/12; B23H 7/22; B23H 9/10
(52) U.S. Cl. ............................. 219/69.15; 204/224 M; 219/69.17; 219/69.2
(58) Field of Search ......................... 219/69.15, 69.17; 204/224 M; 205/640, 686

(56) References Cited

U.S. PATENT DOCUMENTS

| | | | |
|---|---|---|---|
| 3,642,601 A | * | 2/1972 | Kondo ........................ 204/206 |
| 5,861,608 A | * | 1/1999 | Thompson .................. 219/69.2 |
| 6,156,188 A | * | 12/2000 | Yang et al. .................. 205/664 |
| 6,416,650 B1 | * | 7/2002 | Ho .............................. 205/640 |
| 6,562,227 B2 | * | 5/2003 | Lamphere et al. .......... 205/686 |
| 2003/0024825 A1 | | 2/2003 | Lamphere et al. |

OTHER PUBLICATIONS

U.S. patent application Ser. No. 10/248,214, Wei et al., filed Dec. 27, 2002.

U.S. patent application Ser. No. 10/248,216, Batzinger et al., filed Dec. 27, 2002.

Aerospace Engineering Online, http://www.sae.org/aeromag/techupdate 4–00/14.htm, "Improving engine blisk manufacturing", Frank Bokulich, Aerospace Engineering, Apr. 2000.

* cited by examiner

Primary Examiner—Geoffrey S. Evans
(74) Attorney, Agent, or Firm—Penny Clarke; Patrick K. Patnode

(57) ABSTRACT

A ring or inverted-cup shaped cutting element is used as a tool electrode for electromachining to rough machine the airfoils on blisks to near net shape. The cutting element is rotated and positioned with respect to the blisk by a CNC (Computer Numerically Controlled) drive arrangement.

19 Claims, 3 Drawing Sheets

METHOD AND APPARATUS FOR NEAR NET SHAPE RAPID ROUGH ELECTROMACHINING FOR BLISKS

BACKGROUND OF THE INVENTION

The present invention relates generally to an electromachining method and more specifically to an arrangement which can be used to rough machine the airfoils on bladed disks (or so-called blisks) to a near net shape at a high metal removal rate and with a low tooling cost as compared to turning, milling, EDM (electrodischarge machining) or ECM (electrochemical machining).

The electromachining is a technique which utilizes the rotating movement of a profile-shaped electrode to remove material from a work piece by controlled electrical erosion. The kinematics of the machining is analogous to milling or grinding. The tool-electrode is connected to the negative polarity, while the workpiece is connected to the positive polarity of a pulse generator or continuous power supply of direct current. A gap between the electrodes allows for the flow of an electrolyte.

The electrical erosion can be created by electrical breakdown of the electrolyte or vapor-gas layer produced at the machining interface, as well as by instantaneous arcing or transient short-circuits between the electrodes. In all cases, the deciding factor is the electrical current and duration of the erosion process. However, the electrical erosion of the machining surface is relatively course and a large number of craters are formed in the erosion zone. Thus, this technique cannot be used to produce finely machined work pieces.

SUMMARY OF THE INVENTION

A first aspect of the Invention resides in an arrangement for machining airfoils on a blisk, comprising: an annular cutting element supported for rotation about an axis of rotation and adapted for the electromachining.

A second aspect of the invention resides in a method of machining airfoils on a blisk, comprising the steps of: driving an annular cutting element to rotate about its axis; supplying the annular cutting element with a supply of electricity; supplying electrolyte to the interelectrode gap between the annular cutting element and; moving the annular cutting element in multiple mutually opposed directions using a programmable control arrangement to erode material from a work piece to form the blisk.

A third aspect of the invention resides in an arrangement for machining airfoils on a blisk, comprising: means for driving an annular cutting element to rotate about its axis; means for supplying the annular cutting element with a supply of electricity; means for supplying the interelectrode gap with a supply of fluid; and means for moving the annular cutting element in multiple mutually opposed directions using a programmable control arrangement to erode material from a work piece to form the blisk.

DETAILED DESCRIPTION OF THE PREFERRED EMBODIMENTS

Figure 1:
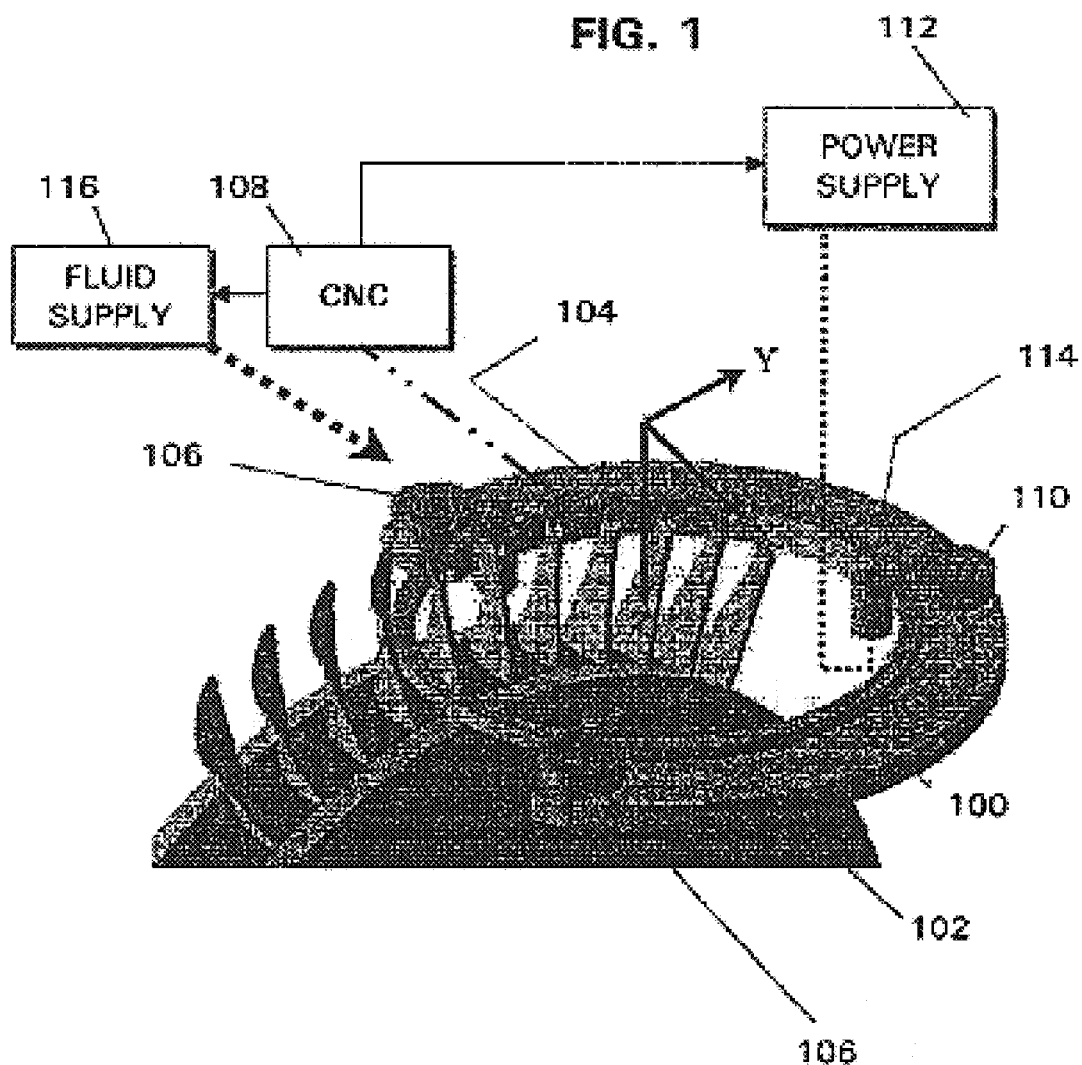
FIG. 1 perspective view showing a first embodiment of the invention.

The present invention is directed to obviating machining difficulties associated with the manufacture of components such as bladed discs and complex structures.

Aircraft engines and industrial gas turbines have traditionally used bladed compressor disks with individual airfoils anchored by nuts and bolts in a slotted central retainer. To reduce aerodynamic losses, weight, and complexity in the engine, these disk assemblies have been replaced with a one-piece bladed disk, which is referred to as a "blisk". One blisk can replace up to 120 parts or more in an engine.

However, blisks are difficult to machine. During the manufacture of a blisk, the workpiece typically begins as a circular disk. Material is removed in such a fashion to form a pocket between the concave and convex surfaces on two adjacent airfoils. This process is repeated until all pockets have been completed and the remaining material defines the preform airfoils and the remainder of the blisk.

The disclosed embodiments of the invention are directed to reducing the difficulty and improving the efficiency with which blisks and the like can be manufactured.

More specifically, embodiments of this invention include both a method and an apparatus for quickly removing this material from a blisk preform using electromachining process. In the first embodiment shown in FIG. 1, the cutting tool, generally denoted by the numeral 100 comprises a circular ring or ring tool 102 made of a suitable electrically conductive material such as mild steel. This ring tool 102 is rotatably supported on an essentially C-shaped support plate 104 by way of a plurality of guide roller sets 106. The thickness, width, and diameter of the ring tool 102 are selected such that it will machine the pockets in such a manner that the remaining material (preform airfoils) are close to net shape with some thickness allowance left over for finishing, and without gouging into the finished shape of the preform. The shape of the support plate is not limited to the illustrated configuration and can be adapted depending on the machining task to which the arrangement is being applied.

The cutting tool 100 is supported and positionally controlled through the use of a support/translation arrangement 108 which may be a commercially available arrangement and which enables movement along a number of axes of motion, such as 4 axes of motion. This support/translation arrangement 108 preferably includes a Computer Numerical Controlled (CNC) drive and control. Control of motion along the X, Y and Z axes is achieved with this arrangement which enables the feedrate in Z-axis to be programmed and controlled. The X and Y translation can also be programmed, controlled and interpolated. This is to enable either the inner diameter (ID) or the outer diameter (OD) of the tool ring to be cut as close to the airfoil sectional profile as possible, leaving some finishing allowance.

Additional axes of motion (viz., rotary and tilt along the longitudinal axis) may be imparted to the workpiece, if this will assist in the machining process. Because the cutting tool is annular, and therefore has a central, circular opening, it can be maneuvered to positions with respect to the work piece which would not be possible with a flat non-perforate disc type cutting element for example.

Rotation of the ring tool 102 in the direction indicated by W, is used to provide a cutting action relative to the stationary circular slab, blank or work piece. As shown in FIG. 1, translation along the Z axis of the ring is used to provide down feeding while cutting a slot on the circular slab in between two airfoils of the blisk. Positional adjustment along the X and Y axes is used to enable the required curvature of the airfoils to be roughed out.

The rotation of tool ring 102 is provided from a drive source 110 which includes a source of rotational energy and which can incorporate a transmission. The rotary source can be an electric motor with a speed control. The transmission can be a gearing such as a step-down gearing, a belt or other means to transmit the rotational motion from the source to the cutting tool.

The rotational speed of the ring tool 102, which determines the cutting surface speed, can be set and controlled to the appropriate level by using one or both of the motor speed control and transmission, which can be provided with a variable speed gearing, if preferred.

In addition to the above, the first embodiment further includes a power supply unit 112 which provides a supply of electricity suitable for the electromachining cutting, to the ring tool 102. The transfer of electricity to the rotating ring 102 can be achieved through a brush system or conductive roller arrangement 114.

Shallow slots 102S (see FIG. 3) can be cut into the cutting face of the ring tool 102 so as to avoid continuous arcing during the electromachining cutting process. A cutting zone is exposed so that cutting fluid can be readily fed into it from a fluid supply 116. This fluid supply includes a pump or the like for inducing a flow of fluid. This fluid can be water, de-ionized water or an aqueous electrolyte solution, dispersion, or mixture of suitable electrolytic substances/liquids or the like. Merely by way of example, solutions of $NaNO_2$, NaOH, or mixtures of $Na_2Co_3$ and $NaNO_2$ can be used.

Figure 3:
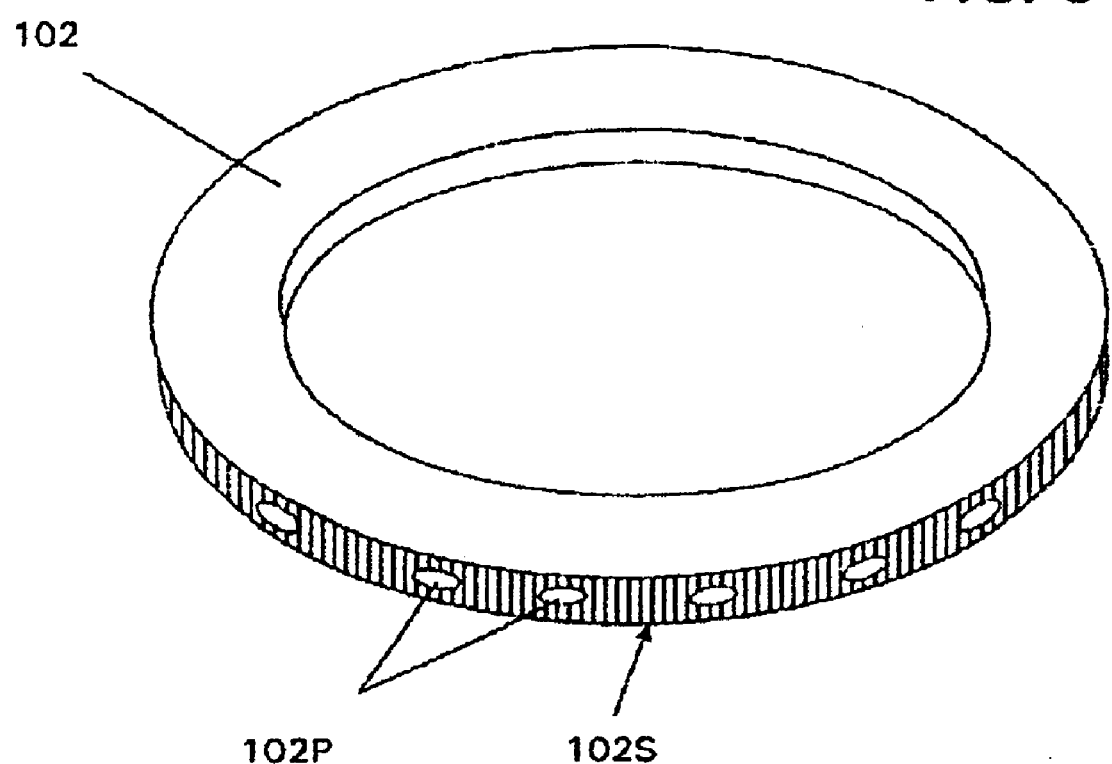
FIG. 3 is a perspective view schematically showing an annular cutting element formed with shallow slots for arc control and a passage structure for fluid delivery.

In the event that the ring tool holder design does not expose the cutting zone, internal passages can be provided in/on the ring tool 102 (see delivery ports 102P associated with this passage structure in FIG. 3) to delivery cutting fluid in sufficient quantities to the cutting zone.

Figure 2:
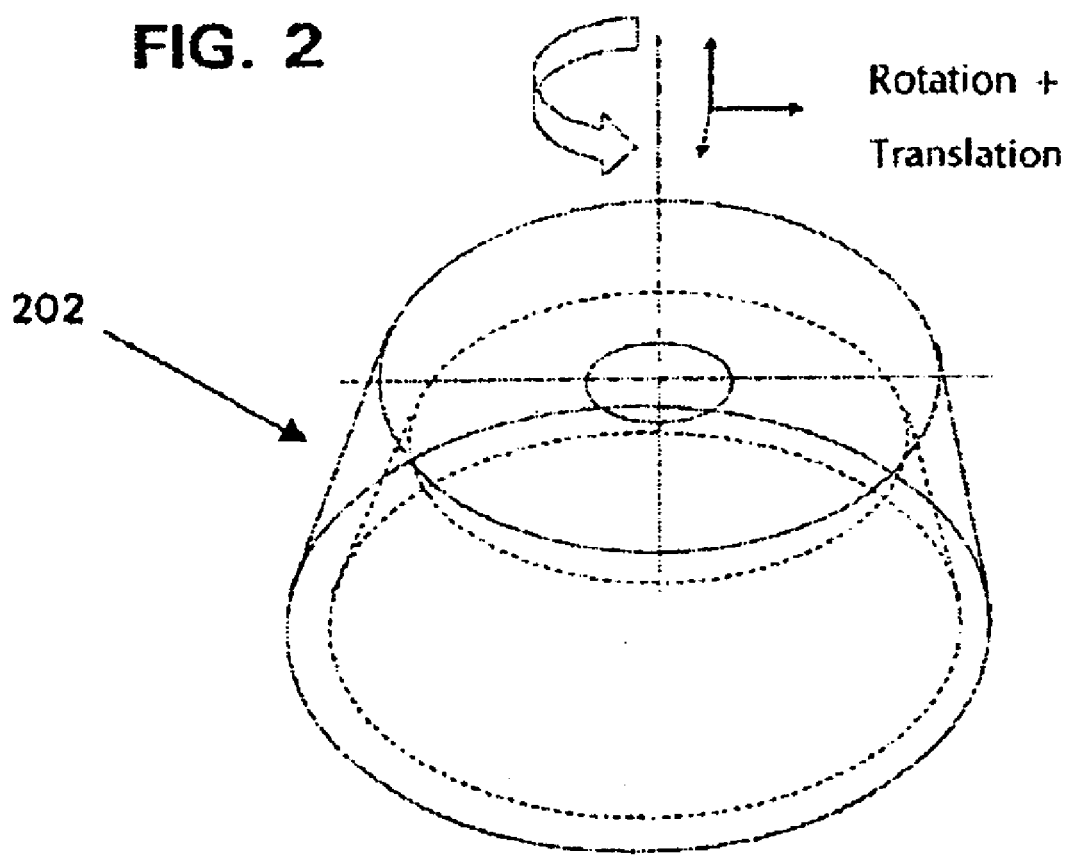
FIG. 2 is a schematic perspective view depicting a second embodiment of the invention.

Other alternative designs may be implemented. For example, as depicted in FIG. 2, a second embodiment of the invention uses an inverted circular cup (viz., a hollow frusto-conical configuration) 202. A drive arrangement having a motor and/transmission, such as disclosed above, is arranged in drive connection with an upper end of the cup. As will be understood, the open end (lip) of the cup is in effect an annular member and acts as the ring cutter disclosed above in connection with the first embodiment (FIG. 1).

While the invention has been described with reference to only a limited number of embodiments, it will be understood that the preceding disclosure would provide one of skill in the art to which the invention pertains or most closely pertains, with the ability to make various modifications and changes without departing from the scope of the appended claims.

What is claimed is:

1. An arrangement for machining airfoils on a blisk, comprising:
   an annular cutting element supported for rotation about an axis of rotation and adapted for an electromachining process, wherein the annular cutting element comprises an annular lip of an inverted cup-shaped member.

2. An arrangement as set forth in claim 1, wherein the annular cutting element is defined along a lip of a frusto-conically shaped cup member.

3. An arrangement as set forth in claim 1, wherein a shaft which is connected to a closed end of the cup-shaped member, is disposed coaxially with the axis about which the cutting element is rotatable and is connected with drive which rotates the cup-shaped member.

4. An arrangement as set forth in claim 1, further-comprising:
   a support and translation device for supporting the annular cutting element and for moving the annular cutting element along at least three mutually opposed axes;
   a drive operatively connected with the annular cutting element to drive the annular cutting element to rotate about the axis of rotation; and
   a power supply operatively connected with the annular cutting element.

5. An arrangement as set forth in claim 4, further comprising a fluid supply providing fluid to the annular cutting element.

6. An arrangement as set forth in claim 5, wherein the fluid supply is adapted to direct fluid to an exposed cutting zone.

7. An arrangement as set forth in claim 5, wherein the fluid supply comprises a passage structure in the annular cutting element which passage structure is adapted to direct fluid into a cutting zone.

8. An arrangement for machining airfoils on a blisk, comprising:
   an annular cutting element supported for rotation about an axis of rotation and adapted for an electromachining process, wherein the annular cutting element is supported on a shaped support plate and is supported so as to be rotatable with respect thereto by a plurality of rollers, and wherein the shaped plate is essentially C-shaped.

9. An arrangement as set forth in claim 8, wherein the shaped plate supports a contact arrangement for transferring electrical power from a power supply to the annular cutting member.

10. An arrangement as set forth in claim 8, wherein the shaped plate supports the drive for driving the annular cutting member to rotate with respect to the shaped plate.

11. An arrangement for machining airfoils on a blisk, comprising:
    an annular cutting element supported for rotation about an axis of rotation and adapted for an electromachining process, wherein the annular cutting element includes a plurality of shallow slots.

12. A method of machining airfoils on a blisk, comprising the steps of:
    driving an annular cutting element to rotate about its axis;
    supplying the annular cutting element with a supply of electricity;
    supplying the annular cutting element with a supply of fluid;
    moving the annular cutting element in three mutually opposed directions using a programmable control arrangement to erode material from a work piece to form the blisk.

13. A method as set forth in claim 12, further comprising the step of supplying the fluid to a zone where erosion of metal is occurring using a passage structure formed in the annular cutting element.

14. A method as set forth in claim 12, further comprising the steps of forming shallow slots in the annular cutting element to prevent continuous arcing between the annular cutting element and the work piece.

15. An arrangement for machining airfoils on a blisk, comprising:
    means for driving an annular cutting element to rotate about its axis;
    means for supplying the annular cutting element with a supply of electricity;

means for supplying the annular cutting element with a supply of fluid;

means for moving the annular cutting element in three mutually opposed directions using a programmable control arrangement to erode material from a work piece to form the blisk; and a plurality of shallow slots formed in the annular cutting element.

16. An arrangement as set forth in claim 15, further comprising a passage structure formed in the annular cutting element for supplying fluid therethrough.

17. An arrangement as set forth in claim 15, further comprising an essentially C-shaped support plate on which the annular cutting element is supported and driven to rotate with respect thereto.

18. An arrangement as set forth in claim 15, wherein the annular cutting element is defined by a lip of an inverted cup-shaped member.

19. An arrangement as set forth in claim 18, wherein the cup-shaped member has a shaft which is operatively connected with the driving means.

* * * * *